United States Patent
Kogge

(10) Patent No.: US 7,639,628 B2
(45) Date of Patent: Dec. 29, 2009

(54) RESPONSE TIME DETECTION IN A NETWORK HAVING SHARED INTERFACES

(75) Inventor: Peter M. Kogge, Granger, IN (US)

(73) Assignee: University of Notre Dame du lac, Notre Dame, IN (US)

( * ) Notice: Subject to any disclaimer, the term of this patent is extended or adjusted under 35 U.S.C. 154(b) by 527 days.

(21) Appl. No.: 11/457,543

(22) Filed: Jul. 14, 2006

(65) Prior Publication Data

US 2007/0014239 A1 Jan. 18, 2007

Related U.S. Application Data

(60) Provisional application No. 60/699,055, filed on Jul. 14, 2005.

(51) Int. Cl.
*G08C 15/00* (2006.01)
(52) U.S. Cl. .................................. 370/252; 714/1; 714/4
(58) Field of Classification Search ................. 370/241, 370/252; 714/100, 1, 25, 27, 28, 29
See application file for complete search history.

(56) References Cited

U.S. PATENT DOCUMENTS

| | | | | |
|---|---|---|---|---|
| 5,528,605 A | * | 6/1996 | Ywoskus et al. | ............ 714/749 |
| 5,530,848 A | * | 6/1996 | Gilbert et al. | ............... 719/313 |
| 5,790,398 A | * | 8/1998 | Horie | ............................. 700/4 |
| 6,741,515 B2 | * | 5/2004 | Lazar et al. | ................. 365/222 |
| 6,894,972 B1 | | 5/2005 | Phaal | |
| 2005/0081101 A1 | * | 4/2005 | Love et al. | ..................... 714/29 |

* cited by examiner

*Primary Examiner*—William Trost, IV
*Assistant Examiner*—Siming Liu
(74) *Attorney, Agent, or Firm*—Schwabe, Williamson & Wyatt

(57) ABSTRACT

A method that includes activating and deactivating two counts between an active state and not an active state such that no more than one count at a time is in an active state. The method also includes receiving a request packet of information that requires a reply and incrementing the count that is in an active state, and setting a flag in the request packet of information that requires a reply, the flag being set to correspond to the count that is in the active state. The method further includes receiving a reply packet of information corresponding to a previously received request packet of information, the reply packet of information having a flag setting corresponding to the previously received request packet of information, and decrementing the count that corresponds to the flag setting of the reply packet of information. A network is also disclosed.

20 Claims, 3 Drawing Sheets

RESPONSE TIME DETECTION IN A NETWORK HAVING SHARED INTERFACES

CROSS REFERENCE TO RELATED APPLICATIONS

The present application claims priority to U.S. Patent Application No. 60/699,055, filed Jul. 14, 2005, entitled "Time-Out Detection in Shared Interfaces," the entire disclosure of which is hereby incorporated by reference in its entirety.

GOVERNMENT INTERESTS

This invention was made with Government support under a subcontract to Subcontract No. NBCH3039003 awarded by DOI/NBC. The Government has certain rights in the invention.

TECHNICAL FIELD

Embodiments of the present invention relate to the field of computer networks, and more particularly, to response time detection in a network having shared interfaces.

BACKGROUND

Generally, computer networks include numerous components in the form of, for example, computing devices and peripheral devices. These devices may be represented as nodes such as requester nodes, each of which is capable of making one or more independent requests for something from one of a plurality of acceptor nodes. Additionally, each device may be represented as including a plurality of such nodes and may even be viewed as its own network. For communication efficiency, it is assumed that all requests from requestor nodes are funneled through a common communication conduit to acceptor nodes. The entrance to this communication conduit may be represented as a gateway, which serves as a network interface. Generally, with such networks, there is a maximum time that each individual request from a requestor node may be pending after it has been sent until a response from the acceptor node should arrive back at the requestor node. After this period of time, a record of this lack of response may be desired and a signal provided to some other apparatus. While one of the most common reasons for such a signal is to declare that a response has not been generated in some predetermined period of time, and thus, perhaps never will due to a malfunction somewhere in the system, other applications may wish to use this information to gauge overall system performance, such as, for example, what is the average time between a request and a response.

In conventional systems, one possible way in which to handle time-out detecting may be to associate a "watchdog" timer with each and every request, start the timer when a request is made, and stop it when the response arrives. If the watchdog timer reaches a maximum before a response arrives, the timer flags a possible error condition. Such timers may be found in either the requesters or the gateway, or both. One problem with such an approach is that once all timers are in use, no more requests may be made.

A second possible approach to error detecting may be to bundle, at the gateway, all requests over some period of time until all requests from a prior bundle have been received. Once the prior bundle of requests has been received, a new bundle of requests may be released. Such an approach may require a potentially large or unbounded amount of storage at the gateway to defer requests. Additionally, it may insert needless delays in moving the requests out to the system where they may be handled.

Another possible approach to the error detecting may be to maintain, either in the gateway or each requestor, for each outgoing request, a request identifier time tag at which a request was sent. The time tag may be erased when the response is received. Periodic checks of all time tags stored in the gateway may identify when a request is overdue. However, once again, such an approach requires resources that, once all are in use, may require suspending more requests until one or more of the resources are available.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide a mechanism for response time detection in a network having shared interfaces with potentially large numbers of concurrent outstanding requests.

Figure 1:
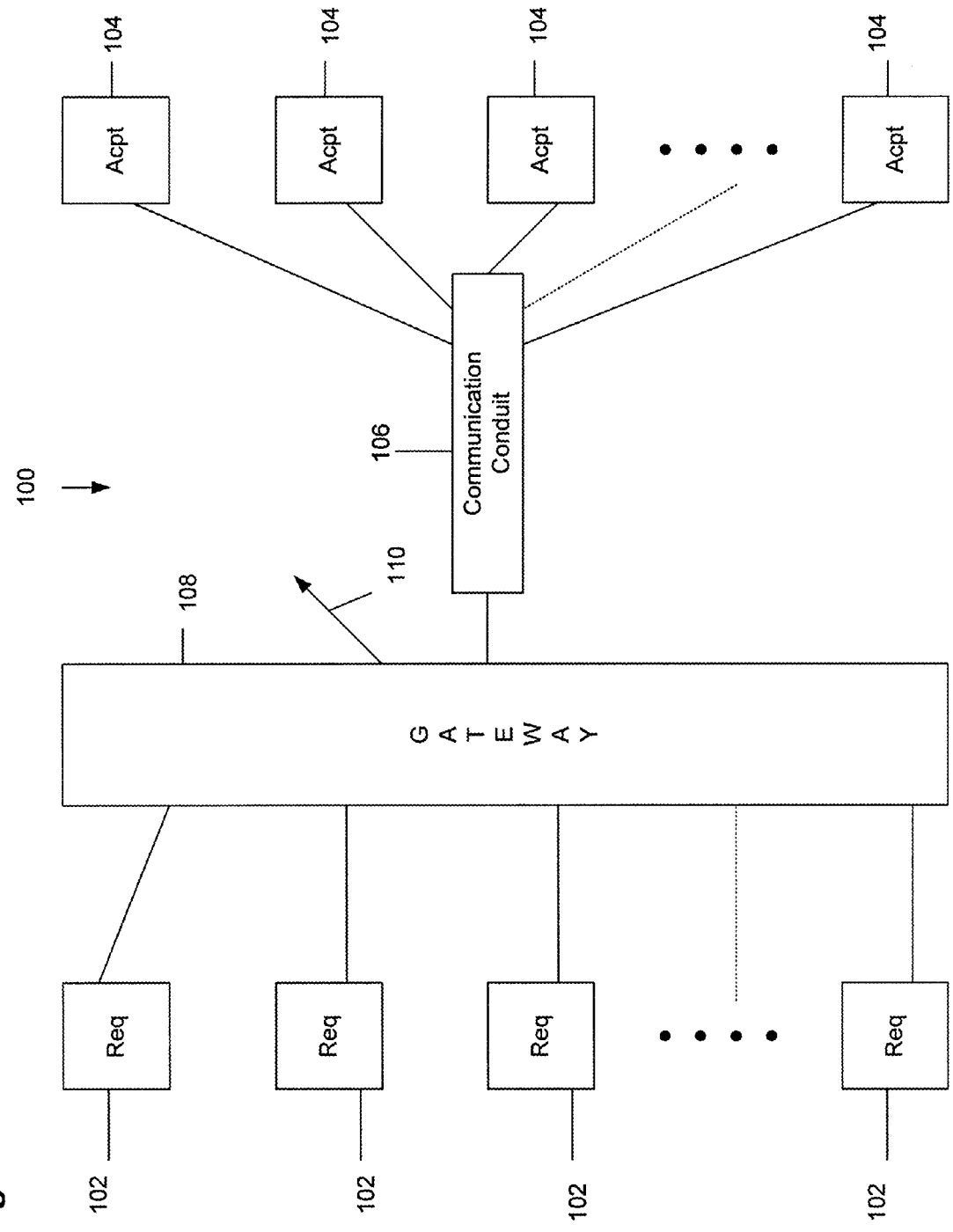
FIG. 1 schematically illustrates a network in accordance with various embodiments of the present invention.

FIG. 1 is a schematic illustrating general operation of networks in accordance with various embodiments of the present invention. Network 100 includes a plurality of requester nodes 102, each of which is capable of making one or more independent requests for something from one of the plurality of acceptor nodes 104. For communication efficiency, it is assumed that all requests from the requestor nodes of FIG. 1 are funneled through a common communication conduit 106, such as a network, to the acceptor nodes, although multiple communication conduits may be used if desired. The entrance to this communication conduit is represented in FIG. 1 as a gateway 108, which serves as a network interface. Generally, with network systems as represented in FIG. 1, there is a maximum time that each individual request from a requester node may be pending after it has been sent until a response from the acceptor node should arrive back at the requestor node. After this period of time, one use of the present invention may be to declare that a time-out has occurred. A signal 110 to that effect may be provided to an apparatus (not shown). Signal 110 may also be used to report other information with regard to the present invention. While the majority of the following embodiments address a first time-out detection use of the present invention, other uses are not precluded.

As illustrated in FIG. 1, the requestor nodes 102 function as requesters wherein the nodes request a service from acceptor nodes 104 within the network, which serve as acceptors. The acceptor nodes provide the requested service of the requester nodes. Thus, a requester node forwards a request packet of information to the gateway, which forwards the request packet of information to an appropriate acceptor node. The acceptor node performs the requested service and then forwards a reply packet of information to the gateway, which forwards the reply packet of information to the original requester node. Those skilled in the art will understand that some requester nodes may also be acceptor nodes and vice versa. However, for simplicity and clarity, the present invention will be described wherein requestor nodes are on the left-hand side of the gateway, as illustrated in FIG. 1, and acceptor nodes are located on the right-hand side, as illustrated in FIG. 1. In accordance with various embodiments, some or even all of the acceptors nodes do not share a gateway.

In accordance with various embodiments of the present invention, requests in the form of request packets of information from requester nodes 102 include one or more flag bits that may be set by a gateway or network interface. In accordance with various embodiments of the present invention, the one or more flag bits may not be modified in any way by the network. Such bits may serve as a flag and remain attached to the request packet of information as it moves through the network.

The gateway, in accordance with various embodiments of the present invention, includes a period timer that may be set to at least some predetermined amount of time when a request may be outstanding before signaling a time-out or the occurrence of an event. Such a timer is independent of the number of outstanding requests that may be pending from a single node, or from all the nodes to which the gateway is connected.

In accordance with various embodiments of the present invention, there may be two or more counters, wherein each counter is configured to maintain one or more counts. In other embodiments, there may be at least one counter within the gateway that may be configured, via software, to maintain two or more counts. In accordance with various embodiments of the present invention, there is one or more flag bits provided within the gateway. In an embodiment, the gateway includes a flag bit that alternates between one of two states, for example A or B. Each of the states of the flag bit is uniquely associated with a unique count. Thus, in such an embodiment, one of the counts is associated with state A and the other count is associated with state B.

Each count is initially set to zero, in accordance with various embodiments of the present invention. Thus, the gateway is initially in a quiescent state. The gateway then sets the flag bit to a first state, for example, A. The gateway also sets the timer to a desired or predetermined time period. When a first request is made by a requestor and reaches the gateway, the timer is started. The timer decrements as time advances, in accordance with various embodiments of the present invention. Alternatively, the timer may increment and signal when a predetermined amount of time is reached.

In accordance with various embodiments of the present invention, for each request packet of information forwarded from a requestor on the left side of FIG. 1, including the first which activates the timer, the packet of information's flag bit is set to the current value of the gateway's flag bit, which for this example is currently A. The count associated with the value A is incremented once each time the gateway handles an outgoing request. Thus, the counter containing count A is currently in an active state.

For each request packet of information that moves through the network from the gateway, nothing is done to the request packet of information's flag bit, in accordance with various embodiments of the present invention. The request packet of information reaches an acceptor node, which processes the request packet of information. Once complete, the acceptor node forwards a reply packet of information back to the gateway. The reply packet of information includes one or more bits that serve as flag bits. The reply packet of information has its flag bit or bits set to the state of the corresponding requestor packet of information, which in this example is A. The reply packet of information is forwarded to the gateway, which then forwards the reply packet of information to the original requesting node. When the reply packet of information arrives at the gateway, the gateway checks the reply packet for its flag bit and decrements the appropriate count. Thus, only request packets of information and returning reply packets of information that pass through the gateway affect the counts in the gateway.

In accordance with various embodiments of the present invention, when the timer reaches the pre-determined amount of time, the gateway changes the flag value, for example from A to B, and the timer is reset. Prior to changing the flag bit and restarting the timer, the value of the count associated with the new state to be active, i.e. the count that has been in an inactive state, is checked. If the value is non-zero, then a signal 110 may be generated indicating the occurrence of this event. The signal may be forwarded to some entity desiring the information. The event may, in accordance with various embodiments of the present invention may be a time-out.

After a change in the flag value, new request packets of information now have their flag bits set to B and the count associated with B is incremented as new request packets of information pass through the gateway. If a received request packet of information at an acceptor has a flag of B, a corresponding reply packet of information prepared at the acceptor has its flag set to B. As reply packets of information arrive at the gateway, the gateway checks their flag bit(s) and decrements the appropriate count, whether or not the appropriate count is in an active state or an inactive state. Thus, depending upon the flag bit of the reply packet of information, either count A or count B is decremented. This process of alternating between states A and B may be repeated over and over.

Figure 2:
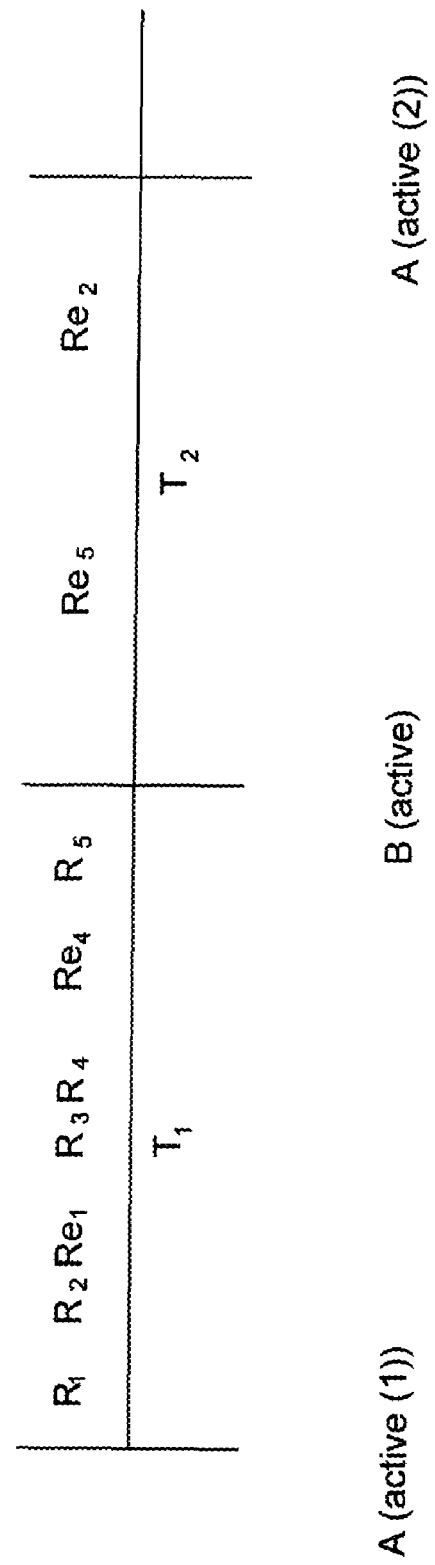
FIG. 2 schematically illustrates an example for response time detection in accordance with various embodiments of the present invention.

Accordingly, as may be seen in FIG. 2, for an example for various embodiments of the present invention, assume that at the beginning of a first predetermined period of time $T_1$, A and its associated count become the active state (A (active 1)). The count associated with A equals zero at this initial point. During $T_1$, five request packets of information pass through the gateway ($R_1$ to $R_5$) and have their flag bits set to A. The count associated with A has its value incremented by one for each of the five request packets of information during $T_1$. Two corresponding reply packets of information ($Re_1$ and $Re_4$) pass through the gateway during $T_1$ (reply packets of information having a flag bit set to B may also pass through the gateway during $T_1$, but are not shown for clarity purposes). The count associated with A has its value decremented by one for each of the two reply packets of information during $T_1$. At the end of the first predetermined period of time $T_1$, B and its associated count are to become the active state (B (active)) for a second predetermined period of time $T_2$. Request packets of information that pass through the gateway $T_2$ will now have their flag bits set to B (not shown for clarity purposes). The count associated with state A has a value of three at this point. During the second predetermined period of time $T_2$, reply packets of information corresponding to requests $R_2$ and $R_5$ ($Re_2$ and $Re_5$) pass through the gateway (reply packets of information having a flag bit set to B may also pass through the gateway during $T_2$, but are not shown for clarity purposes). The count associated with A is decremented by one for each of the two reply packets of information during $T_2$. At the end of the second predetermined period of time $T_2$, A and its associated count are to become the active state (A (active (2)). The gateway checks the value associated with count A and discovers that it has a value of one since a reply packet of information was not received for each of the five request packets of information that passed through the gateway during $T_1$. Thus, in accordance with various embodiments of the present invention, a signal indicating the occurrence of this event may be generated.

Figure 3:
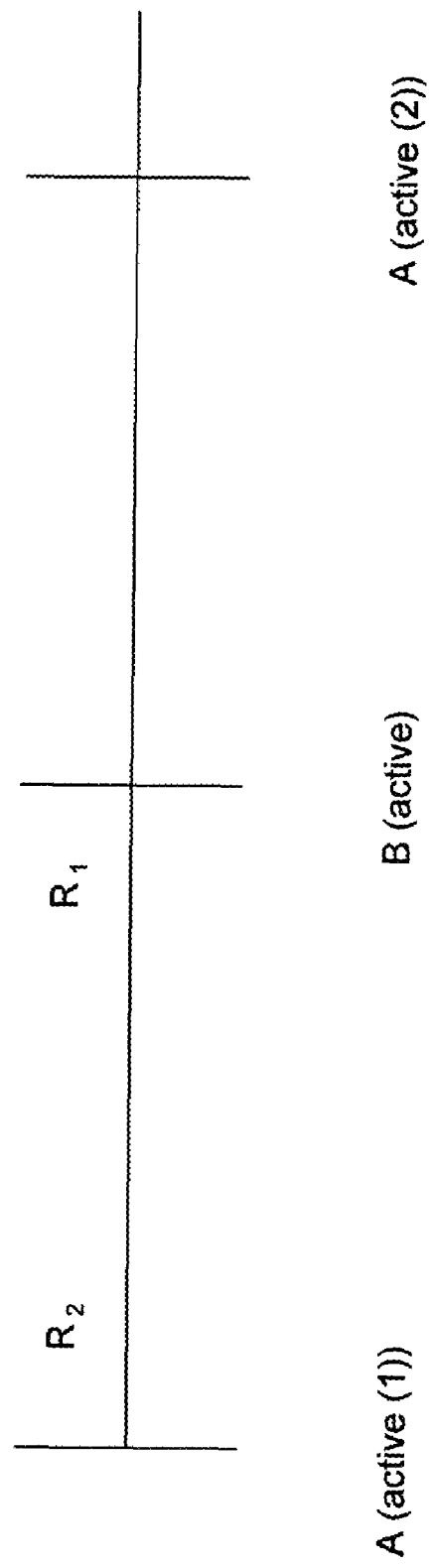
FIG. 3 schematically illustrates a timeline for response time detection in accordance with various embodiments of the present invention.

As may be seen in FIG. 3, in accordance with various embodiments of the present invention, the system will wait at least one predetermined time period from when a request packet of information arrives at the gateway before generating a signal, such as when a request $R_1$ passes through the gateway just before the end of one predetermined time period (A (active 1)) and the check of count A is made just at the start of the next time that A is the active state (A (active 2)), one predetermined time period later. In an embodiment, the system will also wait no longer than just under two predetermined time periods before generating a signal, such as when a request $R_2$ passes through the gateway just after the start of a predetermined time period (A (active 1)) and no reply is received before the next time A is the active state (A (active 2)) and the count is checked.

If a count ever reaches a negative value, in accordance with various embodiments of the present invention, the gateway will declare a protocol error since more replies have been received than requests were made.

In accordance with various embodiments of the present invention, when both counts are concurrently zero, the gateway may infer that there are no outstanding requests from either an A or B time period, and thus the system is idle. Thus, in accordance with the various embodiments of the present invention, when such a quiescent state for the system, i.e. both counts have values of zero, is reached, the timer may be reset. However, once another outgoing request is passed to the gateway, the timer should be allowed to restart timing.

In accordance with various embodiments of the present invention, there may be packets of information sent by requesting nodes through the gateway that do not require a reply. Thus, in accordance with various embodiments of the present invention, the gateway recognizes such packets of information and passes the packets of information onto the network without incrementing the count that is in an active state.

An acceptor node, in accordance with various embodiments of the present invention, may realize that processing of the request packet of information may take a longer amount of time than usual, or may be delayed for various reasons. In such an instance, the acceptor node may forward an intermediate response to the gateway to inform the gateway of the delay. The intermediate message includes a flag bit to inform the gateway to which count (state) the intermediate message pertains. The intermediate message may also optionally include information regarding to which request packet of information the intermediate message pertains. In order to prevent generation of a signal, the gateway may extend the current time period so that the counts (states) are not switched before a full additional period of time has passed. Also, upon receipt of the intermediate message, the gateway does not decrement a count. Alternatively, this timer extension may be performed only if the flag in the intermediate response is a different value from that currently maintained by the gateway.

Alternatively, in accordance with various embodiments of the present invention, when greater control of the maximum period at which a signal is guaranteed to be generated, more than two states may be provided and thus, more than two counts. Each of the counts may be maintained on separate, individual counters, one associated with each state. Also, the states may be ordered in some specific pattern that is repeated over and over as needed. For example, there may be states A, B and C. The counts, in such an example, alternate from A to B to C back to A, and so on, with respect to setting of flag bits within a request packet of information at the gateway. The process proceeds as previously described, with the gateway checking the value of a count just before it becomes active and possibly generating a signal.

In such embodiments that include more than two states, an acceptor node may send an intermediate message to the gateway informing it to decrement the count associated with a state and increment the count of a different state. This informs the gateway that a response for a request may be coming one or more time periods later than expected. For example, the gateway increments by one the count associated with the current active state and decrements the appropriate count associated with the particular request packet of information. In some embodiments of the present invention, the gateway may be configured to generate a signal if multiple intermediate messages are received for the same request packet of information, which may indicate a potential stall in processing of the corresponding request packet of information. Additionally, the gateway may simply generate a signal if the intermediate message indicates that the reply packet of information is going to be advanced too many states.

As previously noted with reference to FIG. 3, the system will wait just under two predetermined time periods if a request $R_2$ passes through the gateway just after the start of a predetermined time period (A (active 1)) and no reply is received before the next time A is the active state (A (active 2)). Likewise, the system will wait at least one predetermined time period from when a request packet of information arrives at the gateway before generating a signal, if a request $R_1$ passes through the gateway just before the end of one predetermined time period (A (active 1)) and no reply is received before the next time A is the active state (A (active 2)). In various embodiments, this situation may be modified to almost arbitrary timing accuracy by increasing the number of flag bits and corresponding counts. If there are N states as opposed to only two states (i.e. $\log_2$ (N) flag bits), then there are N counts, one for each state. The system will cycle through the states in a predetermined order (and wrapping around from state N−1 to state 0), once again starting from a quiescence system state of all counts equaling zero. When the system changes from state i to state j (where j equals (i+1) modulo N), the system first checks the count associated with state j and proceeds only if the count equals zero. If the count associated with state j is non-zero, then a time-out error may be declared. If a desired time-out time is at least T seconds, the period timer may be set to T/(N−1) seconds. Requests may now be timed-out after somewhere between T (if the request originated just before a period ended) to T+T/(N−1) (if the request originated just after the beginning of a period).

In accordance with various embodiments of the present invention, the signal 110 of FIG. 1 may include more information than just a positive indication that one or more requests were not responded to in a timely fashion. The response signal 110 may also include, for example, the count at the beginning of the period and/or the total number of requests that were sent out during the period when the count was originally active. With such information the entity receiving the signal may then be able to deduce interesting system performance characteristics, such as what percentage of requests are not being handled within the predetermined period of time. Depending on the application this may, for example, trigger some attempt to load-balance the system better, and move some requesters or acceptors to different parts of the network.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
providing an apparatus within a gateway of a network to maintain at least two counts that each have an initial value of zero;
activating and deactivating the counts between an active state and not an active state such that no more than one count at a time is in an active state;
receiving, at a gateway, a request packet of information that requires a reply;
setting, by the gateway, a flag in the request packet of information that requires a reply, the flag being set to correspond to the count that is in the active state;
incrementing, by the gateway, the count that is currently in the active state;
receiving, at the gateway, a reply packet of information corresponding to a previously received request packet of information that required a reply, the reply packet of information having a flag setting corresponding to a flag setting of the previously received request packet of information that required a reply; and
decrementing, by the gateway, one of the at least two counts that corresponds to the flag setting of the reply packet of information regardless of which count is currently in the active state.

2. The method of claim 1, further comprising:
checking, by the gateway after a predetermined amount of time, a value of at least one count that is not currently in the active state; and
generating, by the gateway, a signal if the value of the count has a value greater than zero.

3. The method of claim 1, wherein providing an apparatus comprises providing at least two counters, each counter being configured to maintain at least one count.

4. The method of claim 1, wherein providing an apparatus comprises providing one counter that is configured to maintain at least two counts.

5. The method of claim 2, wherein the activating and deactivating occurs at predetermined time intervals, and the checking a value of at least one count that is not currently in the active state occurs at the end of each predetermined time interval.

6. The method of claim 5, wherein checking a value of at least one count that is not currently in the active state comprises checking a value of a count that is not currently in the active state and checking a value of a count that is in the active state.

7. The method of claim 6, wherein checking a value of at least one count that is not currently in the active state further comprises waiting two predetermined time intervals before re-checking the value if both counts have a value of zero.

8. The method of claim 2, further comprising waiting an initial amount of time prior to an initial checking of a value of at least a count that is not currently in the active state.

9. The method of claim 1, further comprising receiving, at the gateway, a request packet of information that does not require a reply and distinguishing, by the gateway, the request packet of information that does not require a reply from a request packet of information that does require a reply such that no count is incremented.

10. The method of claim 5, further comprising receiving, at the gateway, an intermediate response message indicating a delay for a reply packet of information.

11. The method of claim 10, further comprising extending a current predetermined time interval based upon the intermediate response message.

12. The method of claim 11, further comprising limiting, by the gateway, a number of times the current predetermined time interval may be extended.

13. The method of claim 2, wherein the apparatus maintains more than two counts, and checking a value comprises checking a value of a count that is not currently in the active state immediately prior to that count entering the active state.

14. The method of claim 13, further comprising receiving, at the gateway, an intermediate response message indicating a delay for a reply packet of information, and altering the flag of the reply packet of information to correspond to a different count.

15. A network comprising:
a plurality of nodes configured to do at least one of request a service or provide a service; and a gateway operatively coupled to the plurality of nodes, the gateway comprising at least one timer and an apparatus configured to maintain at least two counts, wherein the gateway is configured to:

change states associated with the at least two counts such that no more than one count at a time is in an active state;

set at least one flag bit of a request packet of information received from a node, the flag being set to correspond to the count that is in the active state when the request packet of information is received;

increment the count that is in the active state when the request packet of information is received from the node;

receive a reply packet of information corresponding to a previously received request packet of information, the reply packet of information having a flag setting corresponding to a flag setting of the previously received request packet of information; and decrement one of the at least two counts that corresponds to the flag setting of the reply packet of information when the reply packet of information is received from a node regardless of which count is in the active state.

16. The network of claim 15, wherein the gateway is further configured to:

check a value of at least one count that is not currently in the active state prior to activating the count; and generate a signal if the value of the at least one count is greater than zero.

17. The network of claim 15, wherein the apparatus comprises two counters, each counter being configured to maintain at least one count.

18. The network of claim 17, wherein the apparatus comprises more than two counters.

19. The network of claim 15, wherein the apparatus comprises one counter configured to maintain at least two counts.

20. The network of claim 19, wherein the counter is configured to maintain more than two counts.

* * * * *

UNITED STATES PATENT AND TRADEMARK OFFICE
CERTIFICATE OF CORRECTION

PATENT NO.        : 7,639,628 B2
APPLICATION NO.   : 11/457543
DATED             : December 29, 2009
INVENTOR(S)       : Peter M. Kogge It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this

Ninth Day of November, 2010

David J. Kappos
*Director of the United States Patent and Trademark Office*